(12) United States Patent
Liu et al.

(10) Patent No.: US 12,444,219 B2
(45) Date of Patent: Oct. 14, 2025

(54) FOCUS DETECTION METHOD, APPARATUS, AND ELECTRONIC DEVICE

(71) Applicant: Lenovo (Beijing) Limited, Beijing (CN)

(72) Inventors: Wei Liu, Beijing (CN); Jingxian Liu, Beijing (CN); Lin Zhu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 471 days.

(21) Appl. No.: 17/682,385

(22) Filed: Feb. 28, 2022

(65) Prior Publication Data

US 2023/0094297 A1   Mar. 30, 2023

(30) Foreign Application Priority Data

Sep. 26, 2021   (CN) .......................... 202111128209.2

(51) Int. Cl.
*G06V 30/16*   (2022.01)
*G06T 5/70*   (2024.01)
*G06V 30/14*   (2022.01)
*G06V 30/146*   (2022.01)

(52) U.S. Cl.
CPC .............. *G06V 30/16* (2022.01); *G06T 5/70* (2024.01); *G06V 30/1444* (2022.01); *G06V 30/147* (2022.01)

(58) Field of Classification Search
CPC .. G06V 30/16; G06V 30/1444; G06V 30/147; G06T 5/70
See application file for complete search history.

(56) References Cited

U.S. PATENT DOCUMENTS

2014/0267418 A1* 9/2014 McArdle ............... G06T 19/006
                                                             345/633
2021/0233210 A1* 7/2021 Elron .................... G06T 3/4053

FOREIGN PATENT DOCUMENTS

| CA | 2930543 C | * | 10/2019 | ........... G06V 30/133 |
| JP | 2007264087 A | * | 10/2007 | |
| JP | 2022175606 A | * | 11/2022 | ............. G06T 5/002 |

* cited by examiner

*Primary Examiner* — Wednel Cadeau
(74) *Attorney, Agent, or Firm* — ANOVA LAW GROUP, PLLC

(57) ABSTRACT

A focus detection method includes: acquiring an image of a test object through a to-be-tested image acquisition device, the test object including a character, and a clarity of the character corresponding to a minimum clarity with which a content of the character is still able to be recognized using a character recognition technology; performing character recognition on the image to obtain a recognition result; and determining a focus detection result for the to-be-tested image acquisition device based on the recognition result.

18 Claims, 4 Drawing Sheets

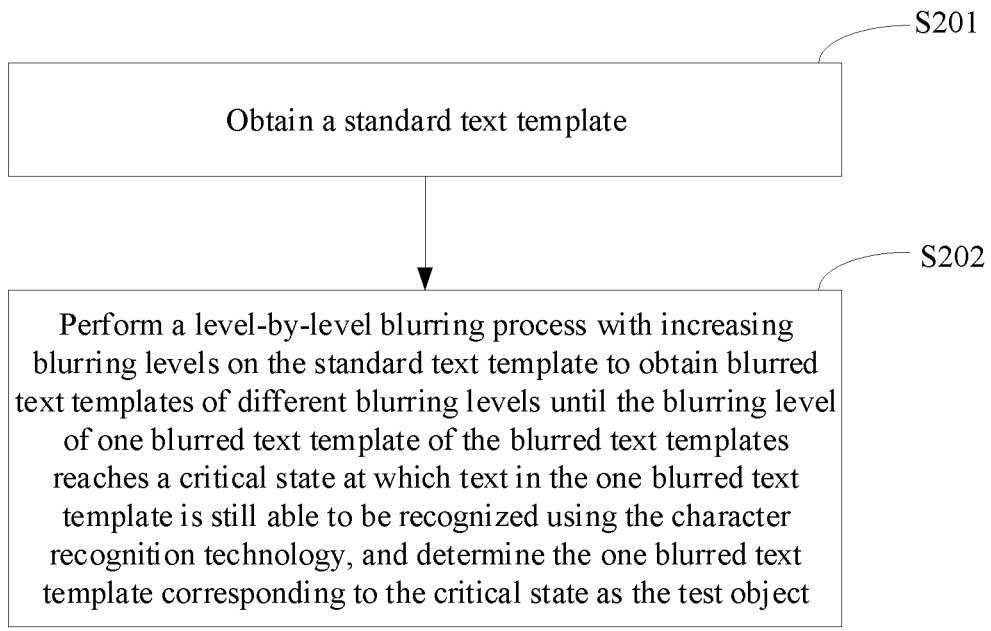
FIG. 2
CHINA    JAPAN    KOREA    ······    CANADA
FIG. 3
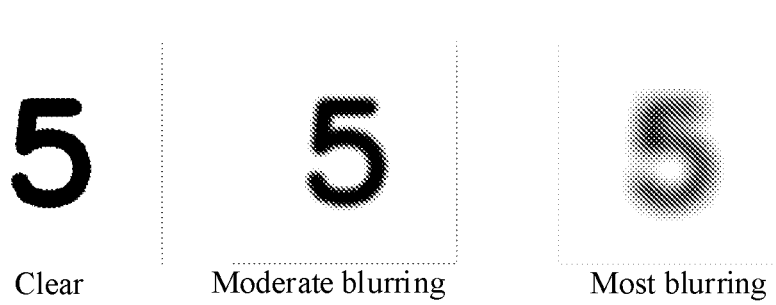
Clear    Moderate blurring    Most blurring
FIG. 4

FOCUS DETECTION METHOD, APPARATUS, AND ELECTRONIC DEVICE

CROSS-REFERENCE TO RELATED APPLICATION

This application claims priority to Chinese Patent Application No. 202111128209.2, filed on Sep. 26, 2021, the entire content of which is incorporated herein by reference.

TECHNICAL FIELD

The present disclosure relates to the technical field of detection technologies and, more particularly, to a focus detection method, apparatus, and electronic device.

BACKGROUND

Image acquisition devices have been widely used in various fields, and various performance parameters thereof directly affect final image quality. For example, whether focus of an image acquisition device is accurate affects clarity of an acquired image. Thus, before the image acquisition device leaves factory, it is needed to test the various performance parameters thereof to determine whether the specific performance parameters meet set requirements.

Currently, a detection method for focus performance of the image acquisition device is out of date, and cannot meet the needs of manufacturers. Thus, a more flexible focus performance detection method is needed to improve the detection of the focus performance of the image acquisition device.

SUMMARY

One aspect of the present disclosure provides a focus detection method. The method includes: acquiring an image of a test object through a to-be-tested image acquisition device, the test object including a character, and a clarity of the character corresponding to a minimum clarity with which a content of the character is still able to be recognized using a character recognition technology; performing character recognition on the image to obtain a recognition result; and determining a focus detection result for the to-be-tested image acquisition device based on the recognition result.

Another aspect of the present disclosure provides an electronic device. The electronic device includes a memory storing program instructions, and a processor configured to execute the program instructions stored in the memory to: acquire an image of a test object through a to-be-tested image acquisition device, the test object including a character, and a clarity of the character corresponding to a minimum clarity with which a content of the character is still able to be recognized using a character recognition technology; perform character recognition on the image to obtain a recognition result; and determine a focus detection result for the to-be-tested image acquisition device based on the recognition result.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 2 is a flowchart of obtaining an exemplary test object according to some embodiments of the present disclosure;

FIG. 3 is a schematic diagram illustrating different blurring levels of exemplary blurred text templates according to some embodiments of the present disclosure;

FIG. 4 is a schematic diagram showing characters with various degrees of Gaussian blurring according to some embodiments of the present disclosure;

DETAILED DESCRIPTION OF THE EMBODIMENTS

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

The embodiments of the present disclosure may be applied to an electronic device. The electronic device may include, but is not limited to, a smart phone, a tablet computer, a wearable device, a personal computer, a notebook computer, etc., which can be selected according to application requirements.

Figure 1:
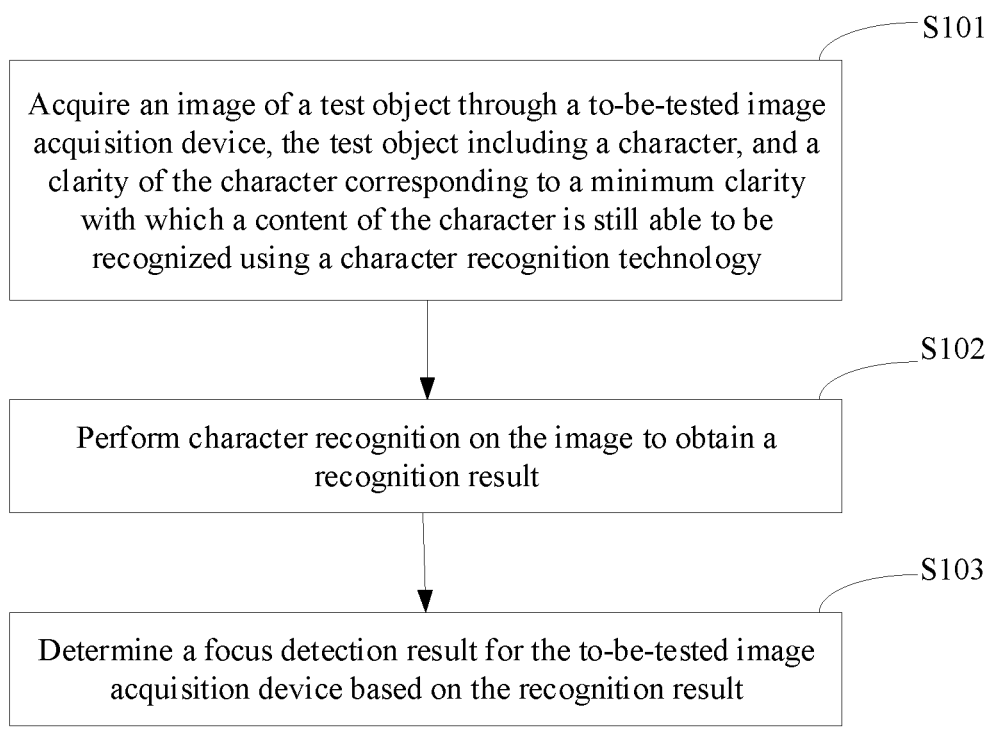
FIG. 1 is a flowchart illustrating an exemplary focus detection method according to some embodiments of the present disclosure.

FIG. 1 is a flowchart illustrating an exemplary focus detection method according to some embodiments of the present disclosure. As shown in FIG. 1, the focus detection method may include the following processes.

At S101, a first image of a test object is acquired through a to-be-tested image acquisition device. The test object includes a character. A clarity of the character corresponds to a minimum clarity with which a content of the character is still able to be identified using a character recognition technology.

In some embodiments, characters of the test object may be any known characters that can be correctly recognized through the character recognition technology. The at least one character of the test object includes a character that has been blurred, and the clarity of the blurred character is in a critical state at which the content of the at least one character can still be correctly identified through the character recognition technology. That is, if the blurred character is slightly blurrier than in the critical state, the content thereof cannot be correctly identified through the character recognition technology. Thus, after the to-be-tested image acquisition device acquires the first image, if the correct content of the at least one character of the first image can be recognized through the character recognition technology, it indicates that the to-be-tested image acquisition device focuses correctly, thereby acquiring a clear character image. On the other hand, if the correct content of the at least one character of the first image cannot be recognized through the character recognition technology, it indicates that the to-be-tested image acquisition device focuses incorrectly, thereby degrading the clarity of the at least one character of the first image and resulting in the content of the at least one character of the first image not being able to be correctly recognized by the character recognition technology.

At S102, character recognition is performed on the first image to obtain a recognition result.

After the to-be-tested image acquisition device acquires the first image, the character recognition is performed on the first image to obtain a recognition result. When the to-be-tested image acquisition device is able to correctly focus on a position corresponding to the at least one character of the test object, the character recognition is able to correctly recognize the content of the at least one character. When the to-be-tested image acquisition device is unable to correctly focus on the position corresponding to the at least one character of the test object, the character recognition is unable to correctly recognize the content of the at least one character. The incorrect recognition result may include failure to recognize the content of the at least one character or recognition of incorrect content.

The character recognition may be optical character recognition (OCR) technology. The present disclosure does not limit the types of the character recognition technologies. Existing or future technologies capable of recognizing content can be applied to the embodiments of the present disclosure, and are within the scope of the present disclosure.

At S103, based on the recognition result, a focus detection result is determined for the to-be-tested image acquisition device.

In some embodiments, if the content of the at least one character of the first image can be correctly recognized through the character recognition technology, the to-be-tested image acquisition device is able to focus correctly. If the content of the at least one character of the first image cannot be correctly recognized through the character recognition technology, a problem of incorrect focusing exists in the to-be-tested image acquisition device.

In the embodiments of the present disclosure, the to-be-tested image acquisition device acquires the image of blurred characters. Because the clarity of the blurred characters is in the critical state at which the content of the blurred character can still be recognized through the character recognition technology, if the content of the blurred characters in the image acquired by the to-be-tested image acquisition device cannot be correctly recognized through the character recognition technology, it is determined that the to-be-tested image acquisition device is able to focus correctly. Otherwise, the to-be-tested image acquisition device is unable to focus correctly. In some embodiments, there is no limitation on the test object. The content included in the test object is flexible as long as the focus detection result is accurate. Thus, the quality of the focus detection is improved.

In some embodiments, the focus detection method may also include obtaining the test object in advance. FIG. 2 is a flowchart of obtaining an exemplary test object according to some embodiments of the present disclosure. As shown in FIG. 2, obtaining the test object includes the following processes.

At S201, a standard text template is obtained.

The standard text template is a text template that has not been processed by any technical or non-technical means, including but not limited to blurring processing, transparency processing, etc. Contents in the standard text template without any processing is clearly identifiable.

At S202, a level-by-level blurring process with increasing blurring levels is performed on the standard text template to obtain blurred text templates of different blurring levels until the blurring level of one blurred text template reaches a critical state at which text in the one blurred text template is still able to be recognized using the character recognition technology, and the one blurred text template corresponding to the critical state is determined as the test object.

FIG. 3 is a schematic diagram illustrating different blurring levels of exemplary blurred text templates according to some embodiments of the present disclosure. As shown in FIG. 3, the text on the far right has the lowest blurring level, and the blurring level of the text increases toward the left and the blurring level of the text on the far left reaches the critical state at which the character recognition can still be performed correctly.

In some embodiments, performing the level-by-level blurring process on the standard text template includes performing a level-by-level Gaussian blurring, granular blurring, or radial blurring process on the standard text template.

For illustration purpose, the Gaussian blurring process is described in detail below for better comprehension of the blurring process. From a mathematical point of view, the Gaussian blurring process of an image is convolution of the image with normal distribution. The Gaussian equation is as follows:

$$G(r) = \frac{1}{\sqrt{2\pi\sigma^2}^N} e^{-r^2/(2\sigma^2)}$$

where r is a radius of a blur kernel and σ is standard deviation of a normal distribution. Through the adjustment of these two parameters, different blur kernels are generated, which are subject to operation with clear image to obtain blurred images of different blurring levels. As shown in FIG. 4, the larger r and σ, the blurrier the generated image is.

The OCR algorithm is performed on the images of different blurring levels to obtain the critical state for correct recognition. The corresponding image is determined as the test object, and remaining images are assigned to other blurring levels accordingly according to actual needs.

Figure 5:
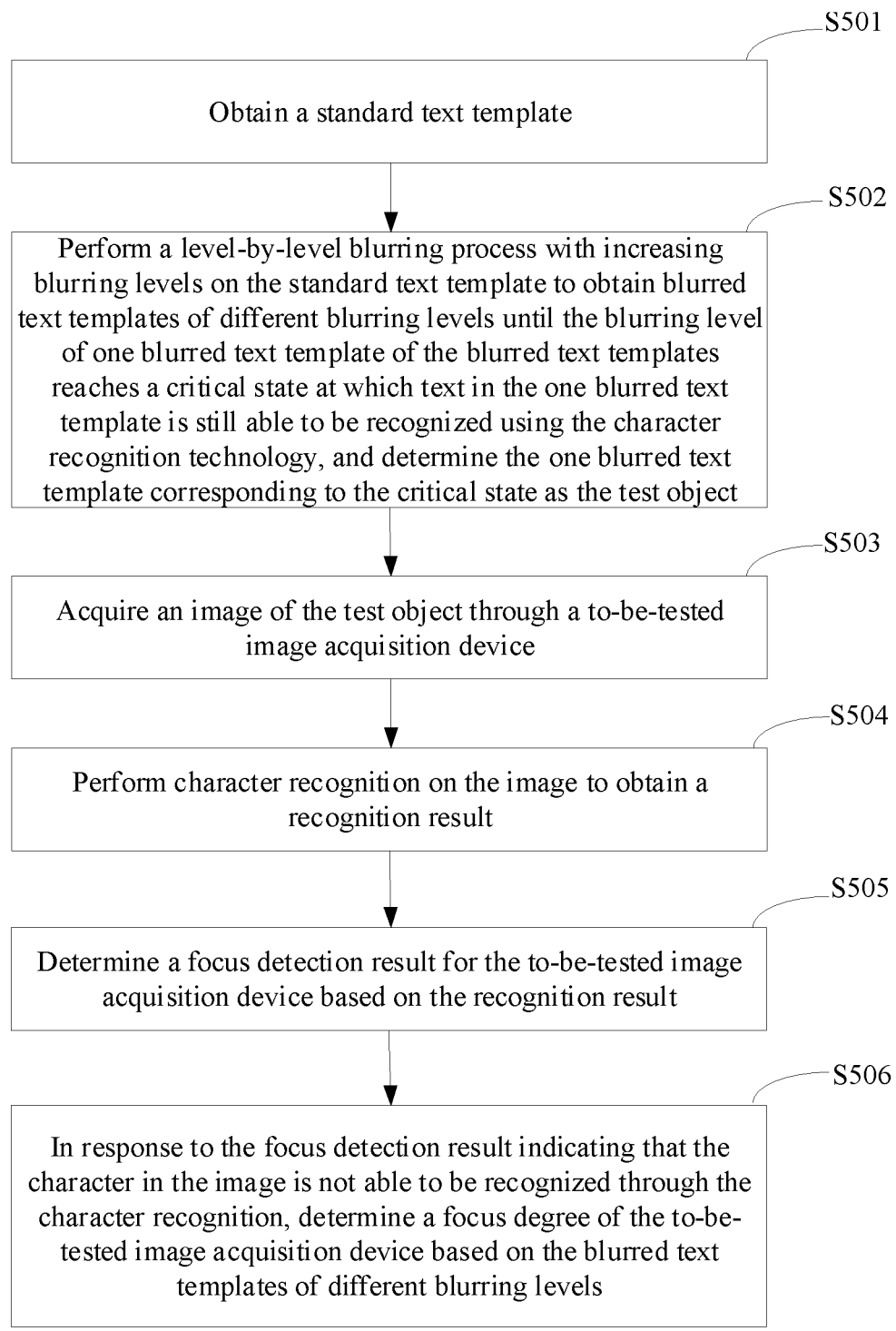
FIG. 5 is a flowchart illustrating another exemplary focus detection method according to some embodiments of the present disclosure.

FIG. 5 is a flowchart illustrating another exemplary focus detection method according to some embodiments of the present disclosure. As shown in FIG. 5, the method includes the following processes.

At S501, a standard text template is obtained.

At S502, a level-by-level blurring process with increasing blurring levels is performed on the standard text template to obtain blurred text templates of different blurring levels until the blurring level of one blurred text template of the blurred text templates reaches a critical state at which text in the one blurred text template is still able to be recognized using the character recognition technology, and the one blurred text template corresponding to the critical state is determined as the test object.

At S503, a first image of the test object is acquired through a to-be-tested image acquisition device. The test object includes a character. A clarity of the character corresponds to a minimum clarity with which a content of the character is still able to be recognized using a character recognition technology.

At S504, character recognition is performed on the first image to obtain a recognition result.

At S505, based on the recognition result, a focus detection result is determined for the to-be-tested image acquisition device.

At S506, in response to the focus detection result indicating that the character in the image is not able to be recognized through the character recognition, a focus degree of the to-be-tested image acquisition device is determined based on the blurred text templates of different blurring levels.

For example, the blurred text templates of different blurring levels are marked with the first level, the second level, the third level, etc. The higher the level, the higher the blurriness. Under the circumstance that the focus detection result indicates that the at least one character in the first image cannot be recognized through the character recognition, a next blurred text template with the highest blurriness among the remaining blurred text templates is selected to be subject to the character recognition to determine whether the character recognition is able to correctly recognize the content of the at least one character in the blurred text template with the highest blurriness. This process repeats until the character recognition is able to correctly recognize the content of the at least one character in the blurred text template. Then the focus degree of the to-be-tested image acquisition device can be determined based on the blurred text template at this level.

Therefore, determining the focus degree of the to-be-tested image acquisition device based on the blurred text templates of different blurring levels includes: in a second image of the blurred text templates of different blurring levels acquired by the to-be-tested image acquisition device, determining the blurred text template with the highest blurriness among the blurred text templates that can be correctly recognized through the character recognition to be a target text template; and determining the focus degree of the to-be-tested image acquisition device based on a blurriness parameter corresponding to the target text template, where the blurriness parameter is a parameter for blurring the standard text template.

For example, the blurred text templates currently have three levels. The blurriness parameter of the blurred text template at the first level is A, the blurriness parameter of the blurred text template at the second level is B, and the blurriness parameter of the blurred text template at the third level is C. The blurriness parameter C is the largest, and the at least one character in the corresponding blurred text template is most blurred. The blurriness parameter A is smallest, and the at least one character in the corresponding blurred text template is least blurred. When the to-be-tested image acquisition device is able to correctly recognize the blurred text template at the third level, the focus degree is 80%. When the to-be-tested image acquisition device is able to correctly recognize the blurred text template at the second level and is unable to correctly recognize the blurred text template at the third level, the focus degree is 60%. When the to-be-tested image acquisition device is able to correctly recognize the blurred text template at the first level and is unable to correctly recognize the blurred text template at the second level, the focus degree is 40%.

In some embodiments, multiple test objects may be included, and at least one character in different test objects is located at different positions, such that the at least one character is located at different positions in a viewfinder of the to-be-tested image acquisition device, thereby performing focus detection in different areas of a lens of the to-be-tested image acquisition device.

Because the to-be-tested image acquisition device has a certain field of view, the position of at least one character in the test object can be at different positions of the field of view. In some embodiments, multiple different test objects may be utilized. In the different test objects, the content and the position of each character may be different, and can be selected according to user's preferences or requirements. In some embodiments, the position of each character in the focus detection process corresponds to a focus performance area of the lens that a user desires to detect. If the user wants to detect the focus performance of area X in the lens, the corresponding character in the test object should be located at a position in the field of view of the lens corresponding to area X. As such, by configuring different text contents and covering different positions in the field of view of the lens of the to-be-tested image acquisition device, the focus degree of each area in the field of view of the lens can be detected efficiently and flexibly.

In some embodiments, acquiring the first image of the test object through the to-be-tested image acquisition device includes: in an environment that satisfies acquisition requirements of the to-be-tested image acquisition device, acquiring the first image of the test object through the to-be-tested image acquisition device.

The environment that satisfies the acquisition requirements of the to-be-tested image acquisition device ensures that the clarity of the first image acquired by the to-be-tested image acquisition device will not be disturbed by external factors, and the accuracy of the detection result is ensured.

Figure 6:
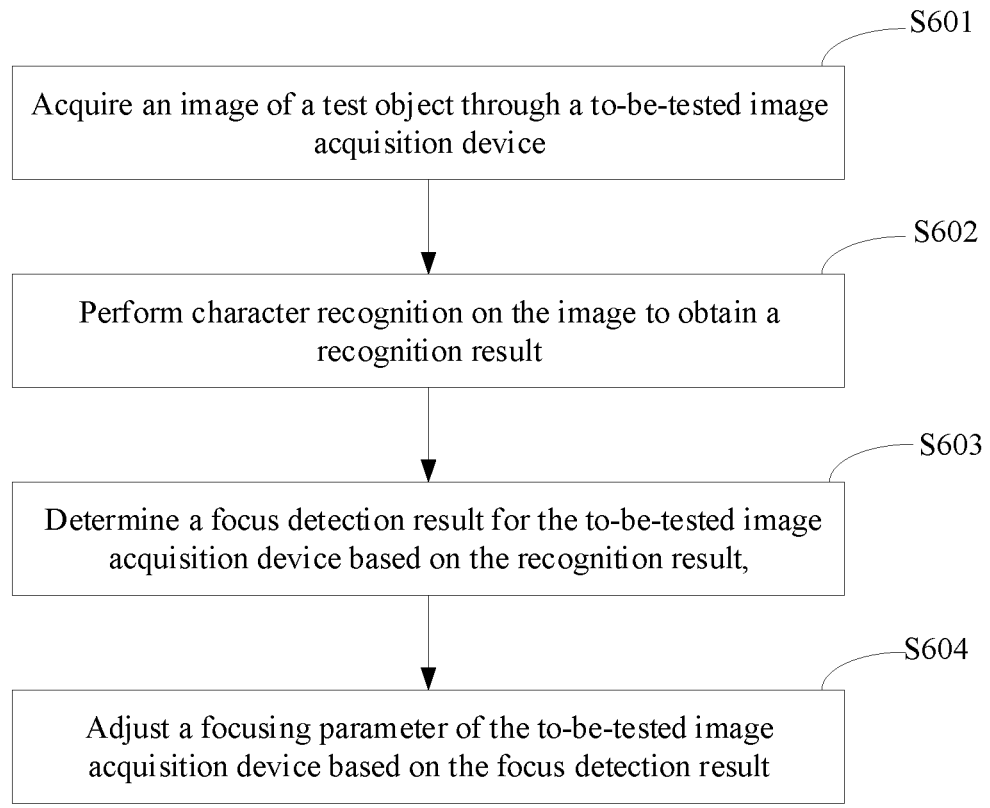
FIG. 6 is a flowchart illustrating another exemplary focus detection method according to some embodiments of the present disclosure.

FIG. 6 is a flowchart illustrating another exemplary focus detection method according to some embodiments of the present disclosure. As shown in FIG. 6, the method includes the following processes.

At S601, a first image of a test object is acquired through a to-be-tested image acquisition device. The test object includes a character. A clarity of the at least one character corresponds to a minimum clarity with which a content of the at least one character can still be correctly recognized using a character recognition technology.

At S602, character recognition is performed on the first image to obtain a recognition result.

At S603, based on the recognition result, a focus detection result is determined for the to-be-tested image acquisition device.

At S604, based on the focus detection result, a focusing parameter of the to-be-tested image acquisition device is adjusted. The focusing parameter may include, but is not limited to, at least one of a focal length, an exposure amount, or a white balance.

In the embodiments of the present disclosure, after the focus detection result is obtained, the focus detection result is used to adjust the focusing parameter to optimize focusing. After the focusing is optimized, the focus detection may be performed again, and based on the focus detection result, the focusing may be optimized again, thereby achieving a closed-loop control and an optimal focus.

In the embodiments of the present disclosure, for illustration purpose, the method is described as a combination of a series of actions. However, those skilled in the art should know that the present disclosure is not limited by described action sequence, because certain actions may be performed in different sequences or simultaneously. Further, those skilled in the art should also know that the embodiments described in the specification are merely exemplary, and the actions and modules involved are not necessarily required by the present disclosure.

The focus detection method is described in detail in the above embodiments of the present disclosure. The focus detection method may be implemented by apparatuses of various forms. Thus, the present disclosure also provides an apparatus, which is described in detail below in various embodiments.

Figure 7:
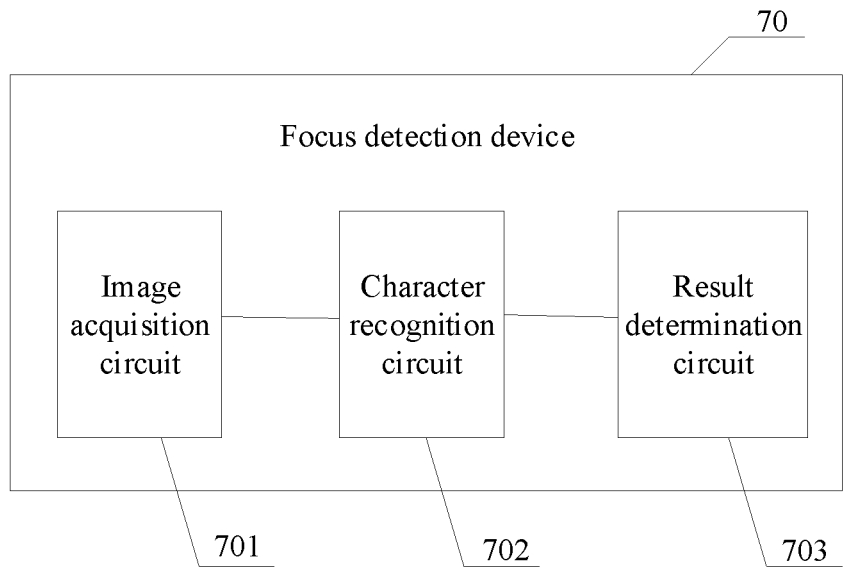
FIG. 7 is a structural diagram illustrating an exemplary focus detection apparatus according to some embodiments of the present disclosure.

FIG. 7 is a structural diagram illustrating an exemplary focus detection apparatus according to some embodiments of the present disclosure. As shown in FIG. 7, the focus detection apparatus 70 includes an image acquisition circuit 701, a character recognition circuit 702, and a result determination circuit 703. The image acquisition circuit 701 is configured to use a to-be-tested image acquisition device to acquire a first image of a test object. The test object includes a character. A clarity of the character corresponds to a minimum clarity with which a content of the character is still able to be recognized using a character recognition technology. The character recognition circuit 702 is configured to perform character recognition on the first image to obtain a recognition result. The result determination circuit 703 is configured to determine a focus detection result for the to-be-tested image acquisition device based on the recognition result.

In some embodiments, the focus detection apparatus uses the to-be-tested image acquisition device to capture the first image of the character that has been blurred. Because the clarity of the character is in a critical state at which the content of the character can still be recognized through the character recognition technology. Thus, if the character recognition technology recognizes the content of the character of the first image, it indicates that the to-be-tested image acquisition device focuses correctly. Otherwise, it indicates that the to-be-tested image acquisition device focuses incorrectly. In some embodiments, there is no limitation on the test object. The content included in the test object is flexible as long as the focus detection result is accurate. Thus, the quality of the focus detection is improved.

In some embodiments, the focus detection apparatus further includes an object acquisition circuit configured to obtain the test object. The object acquisition circuit is configured to: obtain a standard text template; perform a level-by-level blurring process with increasing blurring levels on the standard text template to obtain blurred text templates of different blurring levels until the blurring level of one blurred text template of the blurred text templates reaches a critical state at which text in the one blurred text template is still able to be recognized using the character recognition technology; and determine the one blurred text template corresponding to the critical state as the test object.

In some embodiments, the focus detection apparatus further includes a focus rechecking circuit configured to, after the result determination circuit determines the focus detection result for the to-be-tested image acquisition device based on the recognition result, determine a focus degree of the to-be-tested image acquisition device based on the blurred text templates of different blurring levels under the circumstance that the focus detection result indicates that the character in the first image cannot be recognized through the character recognition.

In some embodiments, the focus rechecking circuit is further configured to: in a second image of the blurred text templates of different blurring levels acquired by the to-be-tested image acquisition device, determine the blurred text template with a highest blurriness among the blurred text templates that are able to be correctly recognized through the character recognition as a target text template; and determine the focus degree of the to-be-tested image acquisition device based on a blurriness parameter corresponding to the target text template, where the blurriness parameter is a parameter used for blurring the standard text template.

In some embodiments, the object acquisition circuit is further configured to perform a level-by-level Gaussian blurring, granular blurring, or radial blurring process on the standard text template.

In some embodiments, the test object is one of a plurality of test objects, and the character is located at different positions in different ones of the plurality of test objects, thereby performing focus detection in different areas of a lens of the to-be-tested image acquisition device.

In some embodiments, the image acquisition circuit is further configured to: in an environment that satisfies acquisition requirements of the to-be-tested image acquisition device, acquire the first image of the test object through the to-be-tested image acquisition device.

In some embodiments, the focus detection apparatus further includes a parameter adjustment circuit configured to, after the result determination circuit determines the focus detection result for the to-be-tested image acquisition device based on the recognition result, adjust a focusing parameter of the to-be-tested image acquisition device based on the focus detection result. The focusing parameter may include, but is not limited to, at least one of a focal length, an exposure amount, or a white balance.

The present disclosure also provides an electronic device. The electronic device includes a processor and a memory for storing executable instructions for the processor. The executable instructions include: acquiring a first image of a test object through a to-be-tested image acquisition device, where the test object includes a character, and a clarity of the character corresponds to a minimum clarity with which a content of the character is still able to be recognized using a character recognition technology; performing character recognition on the first image to obtain a recognition result; and based on the recognition result, determining a focus detection result for the to-be-tested image acquisition device.

In the embodiments of the present disclosure, the focus detection apparatus includes a processor and a memory. The image acquisition circuit, the character recognition circuit, the result determination circuit, the object acquisition circuit, the focus rechecking circuit, and the parameter adjustment circuit may be implemented by storing program modules in the memory, and executing the program modules stored in the memory by the processor to perform corresponding functions.

The processor includes a kernel, and the kernel calls the corresponding program module from the memory. There may be one or more kernels. Returned data may be processed by adjusting kernel parameters.

The memory can include a non-persistent memory, a random-access memory (RAM), and/or a non-volatile memory among computer-readable storage media, such as a read only memory (ROM) or a flash memory (flash RAM). The memory includes at least one memory chip.

The present disclosure also provides a non-transitory computer-readable storage medium on which a program is stored, and when the program is executed by a processor, the focus detection method described in the foregoing embodiments is implemented.

The present disclosure also provides a processor for executing a program, where the focus detection method described in the foregoing embodiments is implemented when the program is executed by the processor.

Further, the present disclosure provides an electronic device including a processor and a memory. The memory is used for storing executable instructions for the processor, and the processor is configured to implement the focus detection method described in the above embodiments by executing the executable instructions.

Various embodiments in the specification are described in a progressive manner, and each embodiment focuses on the differences from other embodiments, and for the same and similar parts between the various embodiments, reference can be made to each other. As for the apparatus disclosed in the embodiments, because of the correspondence to the method disclosed in the embodiments, the description is relatively simple, and reference can be made to the description of the method for relevant parts.

It should also be noted that in the specification, relational terms such as first and second are used only to distinguish one entity or operation from another, and do not necessarily require or imply that there is such actual relationship or order between those entities or operations.

Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

Those skilled in the art can further realize that the units and algorithm steps of the examples described in the embodiments disclosed in the specification can be implemented by electronic hardware, computer software, or a combination of both. To clearly illustrate interchangeabilities of hardware and software, the structures and steps of each example have been generally described in the specification in accordance with the functions. Whether these functions are implemented by hardware or software depends on the specific application and design constraints of the technical solution. Those skilled in the art can use different methods for each specific application to implement the described functions, but such implementation should not be considered beyond the scope of this application.

The steps of the method or algorithm described in the embodiments disclosed in the specification can be directly implemented by hardware, a software module executed by a processor, or a combination thereof. The software module can be stored in random access memory (RAM), internal memory, read-only memory (ROM), electrically programmable ROM, electrically erasable programmable ROM, registers, hard disks, removable disks, CD-ROMs, or any other storage media known in the technical field.

The above description of the disclosed embodiments enables those skilled in the art to implement or use this application. Various modifications to these embodiments will be obvious to those skilled in the art, and the general principles defined herein can be implemented in other embodiments without departing from the spirit or scope of the present application. Therefore, this application will not be limited to the embodiments shown in the specification, but should conform to the broadest scope consistent with the principles and novelties disclosed in the specification.

What is claimed is:

1. A focus detection method comprising:
acquiring an image of a pre-obtained test object through a to-be-tested image acquisition device, the pre-obtained test object including a character, wherein prior to the acquiring of the image of the pre-obtained test object by the to-be-tested image acquisition device, the pre-obtained test object was obtained via a blurring process such that a clarity of the character corresponds to a minimum clarity with which the character is still able to be recognized using a character recognition technology, and the image of the pre-obtained test object is acquired with the character being at a position in a field of view of the to-be-tested image acquisition device to detect an ability of the to-be-tested image acquisition device to correctly focus in an area of the field of view corresponding to the position;
performing character recognition on the image to obtain a recognition result; and
determining a focus detection result for the to-be-tested image acquisition device based on the recognition result, the focus detection result being indicative of the ability of the to-be-tested image acquisition device to correctly focus in the area of the field of view of the to-be-tested image acquisition device.

2. The focus detection method according to claim 1, further comprising:
obtaining the pre-obtained test object including:
obtaining a standard text template;
performing a level-by-level blurring process with increasing blurring levels on the standard text template to obtain blurred text templates of different blurring levels until the blurring level of one blurred text template of the blurred text templates reaches a critical state at which text in the one blurred text template is still able to be recognized using the character recognition technology; and
determining the one blurred text template corresponding to the critical state as the pre-obtained test object.

3. The focus detection method according to claim 1, wherein:
the pre-obtained test object is one of a plurality of pre-obtained test objects; and
the character is located at different positions in different ones of the plurality of pre-obtained test objects.

4. The focus detection method according to claim 1, wherein acquiring the image of the pre-obtained test object through the to-be-tested image acquisition device includes:
in an environment that satisfies acquisition requirements of the to-be-tested image acquisition device, acquiring the image of the pre-obtained test object through the to-be-tested image acquisition device.

5. The focus detection method according to claim 1, further comprising, after determining the focus detection result for the to-be-tested image acquisition device based on the recognition result:
adjusting a focusing parameter of the to-be-tested image acquisition device based on the focus detection result, the focusing parameter including at least one of a focal length, an exposure amount, or a white balance.

6. The focus detection method according to claim 2, further comprising, after determining the focus detection result for the to-be-tested image acquisition device based on the recognition result:
in response to the focus detection result indicating that the character in the image is not able to be recognized through the character recognition, determining a focus degree of the to-be-tested image acquisition device based on the blurred text templates of different blurring levels.

7. The focus detection method according to claim 2, wherein performing the level-by-level blurring processes on the standard text template includes:
    performing a level-by-level Gaussian blurring, granular blurring, or radial blurring process on the standard text template.

8. The focus detection method according to claim 6, wherein:
    the image is a first image; and
    determining the focus degree of the to-be-tested image acquisition device based on the blurred text templates of different blurring levels includes:
        in a second image of the blurred text templates of different blurring levels acquired by the to-be-tested image acquisition device, determining the blurred text template with a highest blurriness among the blurred text templates that are able to be correctly recognized through the character recognition as a target text template; and
        determining the focus degree of the to-be-tested image acquisition device based on a blurriness parameter corresponding to the target text template, the blurriness parameter including a parameter used for blurring the standard text template.

9. An electronic device comprising:
    a memory storing program instructions; and
    a processor configured to execute the program instructions stored in the memory to:
        acquire an image of a pre-obtained test object through a to-be-tested image acquisition device, the pre-obtained test object including a character, wherein prior to the acquiring of the image of the pre-obtained test object by the to-be-tested image acquisition device, the pre-obtained test object was obtained via a blurring process such that a clarity of the character corresponds to a minimum clarity with which the character is still able to be recognized using a character recognition technology, and the image of the pre-obtained test object is acquired with the character being at a position in a field of view of the to-be-tested image acquisition device to detect an ability of the to-be-tested image acquisition device to correctly focus in an area of the field of view corresponding to the position;
        perform character recognition on the image to obtain a recognition result; and
        determine a focus detection result for the to-be-tested image acquisition device based on the recognition result, the focus detection result being indicative of the ability of the to-be-tested image acquisition device to correctly focus in the area of the field of view of the to-be-tested image acquisition device.

10. The electronic device according to claim 9, wherein the processor is further configured to execute the program instructions to:
    obtain a standard text template;
    perform a level-by-level blurring processes with increasing blurring levels on the standard text template to obtain blurred text templates of different blurring levels until the blurring level of one blurred text template of the blurred text templates reaches a critical state at which text in the one blurred text template is still able to be recognized using the character recognition technology; and
    determine the one blurred text template corresponding to the critical state as the pre-obtained test object.

11. The electronic device according to claim 9, wherein:
    the pre-obtained test object is one of a plurality of pre-obtained test objects; and
    the character is located at different positions in different ones of the plurality of pre-obtained test objects.

12. The electronic device according to claim 9, wherein when acquiring the image of the pre-obtained test object through the to-be-tested image acquisition device, the processor is further configured to execute the program instruction to:
    in an environment that satisfies acquisition requirements of the to-be-tested image acquisition device, acquire the image of the pre-obtained test object through the to-be-tested image acquisition device.

13. The electronic device according to claim 9, wherein after determining the focus detection result for the to-be-tested image acquisition device based on the recognition result, the processor is further configured to execute the program instructions to:
    adjust a focusing parameter of the to-be-tested image acquisition device based on the focus detection result, the focusing parameter including at least one of a focal length, an exposure amount, or a white balance.

14. The electronic device according to claim 10, wherein after determining the focus detection result for the to-be-tested image acquisition device based on the recognition result, the processor is further configured to execute the program instructions to:
    in response to the focus detection result indicating that the character in the image is not able to be recognized through the character recognition, determine a focus degree of the to-be-tested image acquisition device based on the blurred text templates of different blurring levels.

15. The electronic device according to claim 10, wherein performing the level-by-level blurring processes on the standard text template, the processor is further configured to execute the program instructions to:
    perform a level-by-level Gaussian blurring, granular blurring, or radial blurring process on the standard text template.

16. The electronic device according to claim 14, wherein the image is a first image; and
    when determining the focus degree of the to-be-tested image acquisition device based on the blurred text templates of different blurring levels, the processor is further configured to execute the program instructions to:
        in a second image of the blurred text templates of different blurring levels acquired by the to-be-tested image acquisition device, determine the blurred text template with a highest blurriness among the blurred text templates that are able to be correctly recognized through the character recognition as a target text template; and
        determine the focus degree of the to-be-tested image acquisition device based on a blurriness parameter corresponding to the target text template, the blurriness parameter including a parameter used for blurring the standard text template.

17. A method for testing focus of an image acquisition device, comprising:
    acquiring an image of a test object through the image acquisition device, the test object including a character, wherein prior to the acquiring of the image of the test object by the image acquisition device, the test object was obtained via a blurring process such that a clarity of the character corresponds to a minimum clarity with which the character is still able to be recognized using a character recognition technology, and the image of the pre-obtained test object is acquired with the character being at a position in a field of view of the to-be-tested image acquisition device to detect an ability of the to-be-tested image acquisition device to correctly focus in an area of the field of view corresponding to the position; and performing character recognition on the image to obtain a recognition result; and determining a focus detection result for the image acquisition device based on the recognition result, the focus detection result being indicative of the ability of the image acquisition device to correctly focus in the area of the field of view of the to-be-tested image acquisition device, wherein obtaining the test object includes:

obtaining a standard text template;

performing a level-by-level blurring process with increasing blurring levels on the standard text template to obtain blurred text templates of different blurring levels until the blurring level of one blurred text template of the blurred text templates reaches the minimum clarity at which text in the one blurred text template is still able to be recognized using the character recognition technology.

18. The focus detection method according to claim 1, wherein:

in response to the obtained recognition result indicating that a content of the character is correctly recognized based on the character recognition performed on the image, the determined focus detection result indicates that the to-be-tested image acquisition device is able to correctly focus in the area of the field of view, and in response to the obtained recognition result indicating that the content of the character is not correctly recognized based on the character recognition performed on the image, the determined focus detection result indicates that the to-be-tested image acquisition device is not able to correctly focus in the area of the field of view.

* * * * *